US011973889B2

United States Patent
Han et al.

(10) Patent No.: US 11,973,889 B2
(45) Date of Patent: Apr. 30, 2024

(54) SEARCHABLE ENCRYPTED DATA SHARING METHOD AND SYSTEM BASED ON BLOCKCHAIN AND HOMOMORPHIC ENCRYPTION

(71) Applicants: ZHEJIANG UNIVERSITY CITY COLLEGE, Zhejiang (CN); ZHEJIANG GONGSHANG UNIVERSITY, Zhejiang (CN); INSTITUTE OF INFORMATION ENGINEERING, CAS, Beijing (CN); ZHEJIANG PONSHINE INFORMATION TECHNOLOGY CO. LTD., Hangzhou (CN)

(72) Inventors: Song Han, Zhejiang (CN); Siqi Ren, Zhejiang (CN); Haiqing Bai, Zhejiang (CN); Ben Niu, Zhejiang (CN); Xiaoli Chen, Zhejiang (CN)

(73) Assignees: Zhejiang University City College (CN); Zhejiang Gongshang University (CN); Insititute Of Information Engineering, CAS (CN); Zhejiang Ponshine Information Technology Co., Ltd. (CN)

( * ) Notice: Subject to any disclaimer, the term of this patent is extended or adjusted under 35 U.S.C. 154(b) by 358 days.

(21) Appl. No.: 17/610,882

(22) PCT Filed: Jul. 8, 2021

(86) PCT No.: PCT/CN2021/105203
§ 371 (c)(1),
(2) Date: Nov. 12, 2021

(87) PCT Pub. No.: WO2022/007889
PCT Pub. Date: Jan. 13, 2022

(65) Prior Publication Data
US 2022/0368545 A1    Nov. 17, 2022

(30) Foreign Application Priority Data

Jul. 8, 2020   (CN) .......................... 202010651041.2

(51) Int. Cl.
*H04L 29/06*     (2006.01)
*H04L 9/00*      (2022.01)
(Continued)

(52) U.S. Cl.
CPC ................ *H04L 9/50* (2022.05); *H04L 9/008* (2013.01); *H04L 9/0618* (2013.01); *H04L 9/3073* (2013.01)

(58) Field of Classification Search
None
See application file for complete search history.

(56) References Cited

U.S. PATENT DOCUMENTS 10,114,969 B1 * 10/2018 Chaney .................. G06F 21/64
10,320,843 B1 *  6/2019 Dobrek ................ H04L 9/0822
(Continued)

OTHER PUBLICATIONS

Chen, Biwen et al. A Blockchain-Based Searchable Public-Key Encryption With Forward and Backward Privacy for Cloud-Assisted Vehicular Social Networks. IEEE Transactions on Vehicular Technology, vol. 69, Issue: 6. https://ieeexplore.ieee.org/stamp/stamp.jsp?tp=&arnumber=8931643 (Year: 2020).*

(Continued)

*Primary Examiner* — Jeremiah L Avery
(74) *Attorney, Agent, or Firm* — McCarter & English, LLP (57) ABSTRACT

The present disclosure relates to a searchable encrypted data sharing method and system based on blockchain and homomorphic encryption, which protects security of sensitive data on the blockchain and realizes searchable and homomorphic calculation of data ciphertext. According to the present disclosure, a data owner encrypts the generated (Continued)

sensitive data and the keywords extracted according to the data with his own key, and then sends the encrypted transaction information to the cloud server. The cloud server verifies the identity of the data owner. If the verification succeeds, the uploaded ciphertext data is stored on a local server, and a ciphertext index, keyword ciphertext and related evidences of the data storage are uploaded to an alliance chain. The alliance chain node verifies the consistency of the uploaded transaction information, and if the verification succeeds, the transaction information is recorded.

6 Claims, 4 Drawing Sheets

(51) Int. Cl.
*H04L 9/06* (2006.01)
*H04L 9/30* (2006.01)

(56) References Cited

U.S. PATENT DOCUMENTS

| | | | | |
|---|---|---|---|---|
| 10,476,847 | B1* | 11/2019 | Smith | H04L 63/102 |
| 10,846,372 | B1* | 11/2020 | Jayachandran | H04L 9/3239 |
| 10,979,225 | B1* | 4/2021 | Shiralkar | H04L 9/3213 |
| 11,063,745 | B1* | 7/2021 | Du | H04L 9/0825 |
| 11,128,437 | B1* | 9/2021 | Nossik | H04L 9/0637 |
| 11,164,107 | B1* | 11/2021 | Craib | G06N 20/00 |
| 11,841,736 | B2* | 12/2023 | Goldfarb | G06F 16/9014 |
| 2019/0036678 | A1* | 1/2019 | Ahmed | H04L 9/008 |
| 2019/0158272 | A1* | 5/2019 | Chopra | H04L 9/0637 |
| 2019/0303579 | A1* | 10/2019 | Reddy | H04L 9/3239 |
| 2019/0311351 | A1* | 10/2019 | Zhang | G06F 16/1824 |
| 2019/0312719 | A1* | 10/2019 | Cheon | H04L 9/14 |
| 2019/0342074 | A1* | 11/2019 | Housholder | G06F 21/6218 |
| 2019/0386814 | A1* | 12/2019 | Ahmed | H04L 9/008 |
| 2020/0076615 | A1* | 3/2020 | Redpath | H04L 9/3252 |
| 2020/0160641 | A1* | 5/2020 | Ruskin | H04L 9/0877 |
| 2020/0167503 | A1* | 5/2020 | Wei | G06F 21/602 |
| 2020/0167512 | A1* | 5/2020 | Chitra | G06Q 50/06 |
| 2020/0213134 | A1* | 7/2020 | Zhang | G06Q 20/0655 |
| 2020/0304290 | A1* | 9/2020 | Coulmeau | G06F 21/6245 |
| 2020/0327546 | A1* | 10/2020 | Pennington | G06Q 20/3829 |
| 2021/0105276 | A1* | 4/2021 | Collinson | H04L 63/0435 |
| 2021/0117909 | A1* | 4/2021 | Paulson | H04L 9/008 |
| 2021/0234668 | A1* | 7/2021 | Manamohan | H04L 9/30 |

OTHER PUBLICATIONS

Kim, Tai-Hoon et al. A Privacy Preserving Distributed Ledger Framework for Global Human Resource Record Management: The Blockchain Aspect. IEEE Access, vol. 8. https://ieeexplore.ieee.org/stamp/stamp.jsp?tp=&arnumber=9095290 (Year: 2020).*

She, Wei et al. Homomorphic Consortium Blockchain for Smart Home System Sensitive Data Privacy Preserving. IEEE Access, vol. 7. https://ieeexplore.ieee.org/stamp/stamp.jsp?tp=&arnumber=8715767 (Year: 2019).*

Yang, Yang et al. Blockchain-Based Verifiable Multi-Keyword Ranked Search on Encrypted Cloud With Fair Payment. IEEE Access, vol. 7. https://ieeexplore.ieee.org/stamp/stamp.jsp?tp=&arnumber=8847333 (Year: 2019).*

* cited by examiner

SEARCHABLE ENCRYPTED DATA SHARING METHOD AND SYSTEM BASED ON BLOCKCHAIN AND HOMOMORPHIC ENCRYPTION

CROSS REFERENCE TO RELATED APPLICATION(S)

The present application is a national phase application, and claims the benefit of priority to, International Patent Application No. PCT/CN2021/105203, filed Jul. 8, 2021, which claims the benefit of priority to Chinese Patent Application No. 202010651041.2, filed on Jul. 8, 2020, with an invention title of "Searchable Encrypted Data Secure Sharing Method and System Based on Homomorphic Encryption and Blockchain", the entire content of each of the foregoing patent applications incorporated herein by reference.

TECHNICAL FIELD

The present disclosure relates to the technical field of blockchain, and in particular to a searchable encrypted data sharing method and system based on blockchain and homomorphic encryption.

BACKGROUND ART

In recent years, with the popularity of digital currency, blockchain as its underlying technology has become a popular research object for scholars both domestic and abroad, and the research and application of blockchain have been increasing. Due to its decentralization, traceability, and anti-tampering characteristics, blockchain is popular in various fields, such as smart finance, smart security, smart cities, smart medical treatment, and e-government, and the like.

Blockchain not only provides a unified data application platform with strong credibility, high transparency, and weak centralization for life and production, but also ensures integrity and credibility of application data. However, the blockchain technology still has shortcomings in data storage, management, organization and application, which impedes the further development of the blockchain.

With the development of information technology, mankind has entered the big data era. The blockchain stores the plaintext transaction data of each user, and the data are open and transparent. With the advancement of big data technology, attackers can use massive data transaction records to dig the relationship between users and different transactions, so as to achieve the purpose of de-anonymization of blockchain users. It is urgent to resolve the blockchain user privacy and data privacy issues. Although sensitive data in transactions can be encrypted and uploaded to ensure its security, encryption may cause data unavailability. In many application fields, operations such as processing, searching, and sharing need to be performed on data. Encryption alone cannot implement the above operations.

Sana et al. used attribute-based encryption and access control structures to protect user privacy of outsourced data and confidentiality of access policies, but they are based on cloud server databases. ZhongChao Blockchain Technology Research Institute has implemented a query plan based on blockchain business information by analyzing and indexing new blocks in the blockchain. Curtmola et al. adopted symmetric searchable encryption and broadcast encryption technology to enable data owners to dynamically manage search credentials and implement a multi-user search mode, but a trusted third party is introduced. At present, most relevant researches are targeted toward management organizations for plaintext data on the blockchain, and there is no searchable research for encrypted data. Therefore, the secure storage and search of sensitive data has become a research hotspot in various application fields.

SUMMARY

In view of the above, the present disclosure provides a searchable encrypted data sharing method and system based on blockchain and homomorphic encryption. The solution provides the business having sensitive data in application scenarios based on blockchain with technical support by combining homomorphic encryption, blockchain technology and searchable encryption technology.

In order to achieve the above objectives, the present disclosure provides the following steps:

A searchable encrypted data sharing method based on blockchain and homomorphic encryption, comprising the following steps:

a) system initialization:
generating relevant system parameters according to security parameters, the system parameters being used to generate a public-private key pair of a user, identity verification and consistency verification; and defining a keyword set, which is used for the consistency verification of on-chain transaction;

when the user joins an alliance chain, a cloud server assigning an identity identification to the user, and the user generating the public-private key pair and makes his/her public key open, the cloud server signing the user's identity by using the user's public key, a public key of an alliance chain manager, and its own private key, and uploading it to an alliance chain network;

b) data release;
a data owner encrypting his sensitive data and keywords corresponding to the sensitive data, and sending ciphertext of the sensitive data, ciphertext of the keyword, his/her own identity information and proof of consistency to the cloud server;

the cloud server verifying the identity of the data owner; if the verification succeeds, the sensitive data being stored in a local server, and a ciphertext index value of the sensitive data, the ciphertext of the keyword, and the proof of consistency being sent to the alliance chain;

after the alliance chain receives the data uploaded by the cloud server, it verifying the consistency of the message; if the verification is passed, the pseudo-identity information of the data owner, the ciphertext index value of the sensitive data and the ciphertext of the keywords being stored in the alliance chain;

c) data request:
a data requester generating a trapdoor function of the keyword, and sending the trapdoor function to the manager in the alliance chain;

after receiving the request, the manager verifying the identity information of the data requester; if the verification is passed, performing search operation, and sending the ciphertext index value of the found sensitive data to the cloud server;

the cloud server receiving the ciphertext index value of the sensitive data; if the number of index values is 1, a partial decryption operation being performed on the ciphertext of the sensitive data, and the partially decrypted ciphertext being sent to the manager; the manager then performing partial decryption on the data again, and returning a final decryption result to the data requester:

if the number of index values is greater than 1, performing a homomorphic operation on the ciphertext set, and then partially decrypting the ciphertext result after the homomorphic operation, and finally sending the partial decryption result to the manager; the manager using his own private key to perform partial decryption after receiving the partially decrypted ciphertext set, and returning the final decryption result to the data requester;

d) data acquisition:

the data requester obtaining the converted ciphertext data, decrypting it with his own private key to obtain a plaintext message, so as to obtain the sensitive data related to the searched keywords.

Optionally, the cloud server is configured to store the ciphertext of the sensitive data.

Optionally, the user randomly generates a public-private key pair according to the system public parameters, and the generation of the public-private key pair is independent from a trusted third party.

Optionally, the cloud server assigns real identity information to the user, and the user uses pseudo-identity information to upload data and request data operations.

Optionally, from top to bottom, the alliance chain comprises: an application layer, a contract layer, an incentive layer, a consensus layer, a network layer and a data layer;

the data layer is used to store transaction logs and transaction-related contents, that is, the pseudo-identity information of the data owner, ciphertext index and keyword ciphertext;

the consensus layer adopts a PBFT consensus algorithm.

A searchable encrypted data sharing system based on blockchain and homomorphic encryption, comprising:

a first system initialization module, configured to generate related system parameters according to security parameters, the system parameters are used for generating user's public-private key pair, identity verification and consistency verification; and define a keyword set, which is for consistency verification of on-chain transaction;

a second system initialization module, configured to, when a user joins an alliance chain, assign an identity identification to the user by a cloud server, and generate a public-private key pair and make a public key open by the user; sign the user's identity by the cloud server by using the user's public key, the public key of an alliance chain manager, and its own private key, and upload it to an alliance chain network;

a first data transmission module, configured to encrypt his sensitive data and keywords corresponding to the sensitive data by the data owner, and send ciphertext of the sensitive data, ciphertext of the keyword, his own identity information and proof of consistency to the cloud server;

a second data transmission module, configured to verify the identity of the data owner by the cloud server; if the verification succeeds, store the sensitive data in a local server, and sending a ciphertext index value of the sensitive data, the ciphertext of the keyword, and the proof of consistency to the alliance chain;

a data storage module, configured to, after the alliance chain receives the data uploaded by the cloud server, verify the consistency of the message, and if the verification is passed, store the pseudo-identity information of the data owner, the ciphertext index value of the sensitive data and the ciphertext of the keywords in the alliance chain;

a data request module, configured to generate a trapdoor function of the keyword by a data requester, and send the trapdoor function to the manager in the alliance chain;

a ciphertext index value sending module, configured to, after receiving the request, verify the identity information of the data requester by the manager, and if the verification is passed, perform search operation, and send the ciphertext index value of the searched sensitive data to the cloud server:

a first decryption result determination module, configured to receive the ciphertext index value of the sensitive data by the cloud server; if a number of index values is 1, perform a partial decryption operation on the ciphertext of the sensitive data, and send the partially decrypted ciphertext to the manager, then perform partial decryption on the data by the manager again, and return a final decryption result to the data requester;

a second decryption result determination module, configured to, if the number of index values is greater than 1, perform a homomorphic operation on the ciphertext set, and then partially decrypt the ciphertext result after the homomorphic operation, and finally send the partial decryption result to the manager; the manager using his own private key to perform partial decryption after receiving the partially decrypted ciphertext set, and returning the final decryption result to the data requester;

a data acquisition module, configured to, obtain the converted ciphertext data for the data requester, decrypt it with his own private key to obtain a plaintext message, so as to obtain the sensitive data related to the searched keywords.

According to the specific embodiments provided by the present disclosure, the present disclosure offers the following technical effects:

(1) The user uses a pseudo-ID to upload data, and the alliance chain nodes cannot infer mapping relationship between the user and the data from the historical transaction data, thereby protecting the privacy of the user's identity.

(2) Based on homomorphic encryption technology, the user adopts the joint key of the cloud server and the alliance chain node to encrypt the uploaded data, and the message ciphertext is stored in the cloud server; the corresponding plaintext cannot be obtained even if the attacker obtains the ciphertext data in the cloud server or the cloud server's key; secondly, the ID of the data owner stored in the cloud server is a pseudo ID generated by the user, and the attacker cannot obtain the mapping relationship between the user and the corresponding ciphertext from the obtained information.

(3) Through the searchable encryption technology, the user can generate keyword trapdoors to be queried, and the alliance chain nodes verify the identity of the queryer, and then perform the query operation after the verification is passed. The query result is the index value of the ciphertext stored in the cloud server. In this process, the alliance chain nodes cannot obtain any information about query keywords and corresponding cipher texts through querying requests. It realizes the availability of the encrypted data while protecting data privacy.

BRIEF DESCRIPTION OF THE DRAWINGS

In order to explain the embodiments of the present disclosure or the technical solutions in the prior art more clearly, the following will briefly introduce the accompanying drawings used in the embodiments. Obviously, the accompanying drawings in the following description are only some embodiments of the present disclosure. Other drawings can be obtained for those of ordinary skill in the art based on these drawings without creative efforts.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present invention, all other embodiments obtained by those of ordinary skill in the art without creative efforts shall fall within the protection scope of the present invention.

An object of the present disclosure is to provide a searchable encrypted data sharing method and system based on blockchain and homomorphic encryption. The scheme provides support for the business having sensitive data in application scenarios based on blockchain by combining homomorphic encryption, blockchain technology and searchable encryption technology.

In order to make the above objects, features, and advantages of the present disclosure be clearer and easier to be understood, the following will further describe the present disclosure by combining with the accompanying drawings and the detailed embodiments.

The main concept of the present disclosure is: over an alliance chain network, the data owner encrypts the generated sensitive data and the keywords extracted according to the data with his own key, and then sends the encrypted transaction information to the cloud server. The cloud server verifies the identity of the data owner. If the verification succeeds, the uploaded ciphertext data is stored in the local server, and the index of the data storage, the keyword ciphertext and related evidence are uploaded to the alliance chain, the alliance chain node verifies the consistency of the uploaded transaction information, and if the verification succeeds, the transaction information is recorded.

The cloud server receives the ciphertext with an index value of 1, and then performs partial decryption operation on the ciphertext, and sends the partially decrypted ciphertext to the alliance chain manager. The manager performs partial decryption on the data again, and returns the final decryption result to the data requester; if the number of index values is greater than 1, perform a homomorphic operation on the ciphertext, and then perform partially decrypt on the ciphertext result after the homomorphic operation. The manager will use his own private key to perform partial decryption after receiving the partially decrypted ciphertext, and returns the final decryption result to the data requester. The data requester obtains the converted ciphertext data and decrypts it with his own private key to obtain data related to the searched keywords.

Figure 1:
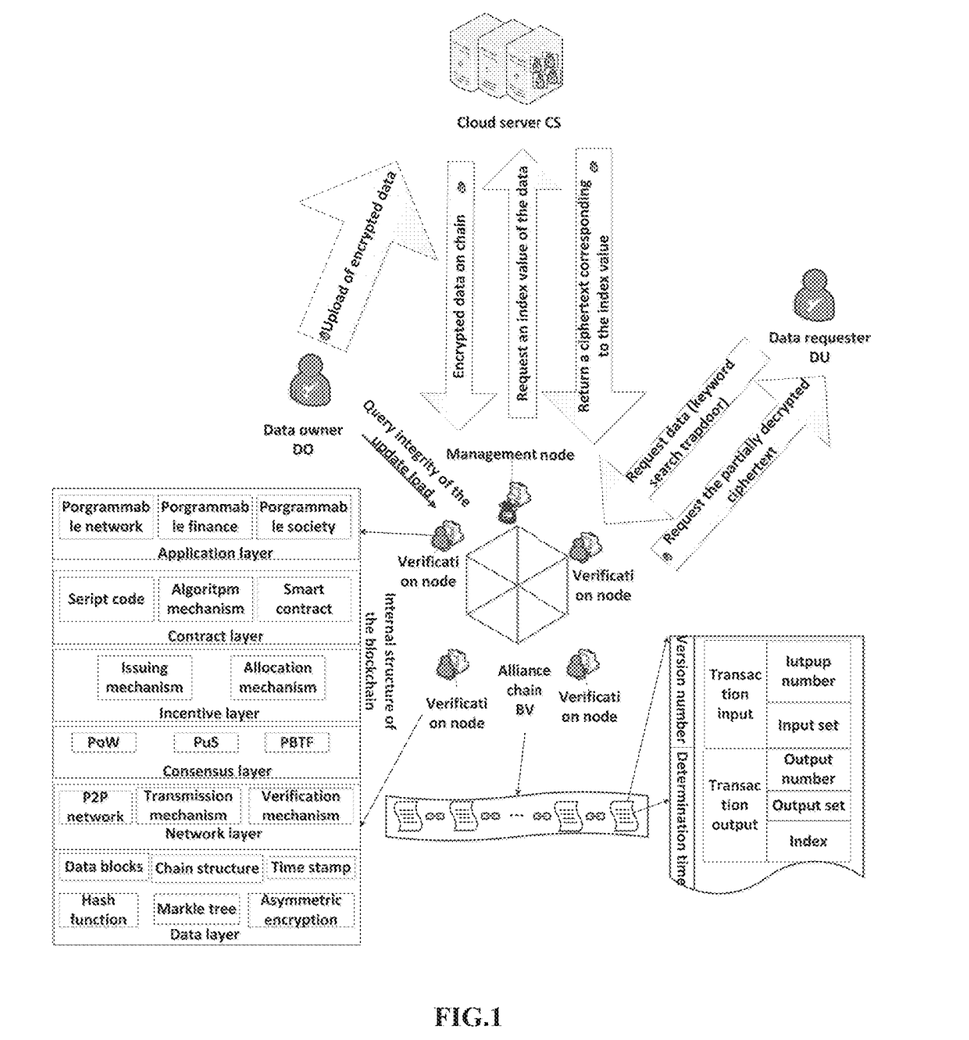
FIG. 1 is a schematic flow chart of a searchable encrypted data sharing method based on blockchain and homomorphic encryption provided by the present disclosure.

As illustrated in FIG. 1, the present disclosure provides a searchable encrypted data sharing method based on blockchain and homomorphic encryption, which comprises the following steps:

a) System initialization:

Generating relevant system parameters according to security parameters, the system parameters being used to generate a public-private key pair of a user, identity verification and consistency verification; and defining a keyword set, which is used for the consistency verification of on-chain transaction; the user randomly generating a public-private key pair according to the system public parameters, where the generation of the public-private key pair is independent from a trusted third party;

When the user joins an alliance chain, a cloud server assigning an identity identification to the user, and the user generating the public-private key pair and makes his/her public key open, the cloud server signing the user's identity by using the user's public key, a public key of an alliance chain manager, and its own private key, and uploading it to an alliance chain network;

b) Data release:

A data owner encrypting his sensitive data and keywords corresponding to the sensitive data, and sending ciphertext of the sensitive data, ciphertext of the keyword, his/her own identity information and proof of consistency to the cloud server; the cloud server is configured to store the ciphertext of the sensitive data, i.e., the cloud server cannot decrypt the ciphertext.

The cloud server verifying the identity of the data owner; if the verification succeeds, the sensitive data being stored in a local server, and a ciphertext index value of the sensitive data, the ciphertext of the keyword, and the proof of consistency being sent to the alliance chain;

After the alliance chain receives the data uploaded by the cloud server, it verifying the consistency of the message; if the verification is passed, the pseudo-identity information of the data owner, the ciphertext index value of the sensitive data and the ciphertext of the keywords being stored in the alliance chain; the cloud server assigns real identity information to the user, and the user uses the pseudo identity information for uploading data and requesting data operation.

The alliance chain may include: an application layer, a contract layer, an incentive layer, a consensus layer, a network layer and a data layer, from top to bottom:

The data layer is used to store transaction logs and transaction-related contents, that is, the pseudo-identity information of the data owner, ciphertext index and keyword ciphertext;

The consensus layer adopts a PBFT consensus algorithm.

c) data request:

A data requester generating a trapdoor function of the keyword, and sending the trapdoor function to the manager in the alliance chain;

After receiving the request, the manager verifying the identity information of the data requester; if the verification is passed, performing search operation, and sending the ciphertext index value of the found sensitive data to the cloud server;

The cloud server receiving the ciphertext index value of the sensitive data; if the number of index values is 1, a partial decryption operation being performed on the ciphertext of the sensitive data, and the partially decrypted ciphertext being sent to the manager; the manager then performing partial decryption on the data again, and returning a final decryption result to the data requester;

if the number of index values is greater than 1, performing a homomorphic operation on the ciphertext set, and then partially decrypting the ciphertext result after the homomorphic operation, and finally sending the partial decryption result to the manager; the manager using his own private key to perform partial decryption after receiving the partially decrypted ciphertext set, and returning the final decryption result to the data requester:

d) data acquisition:

The data requester obtaining the converted ciphertext data, decrypting it with his own private key to obtain a plaintext message, so as to obtain the sensitive data related to the searched keywords.

As illustrated in FIG. 1, the present disclosure is mainly divided into three stages: system initialization, data generation and storage, and data search and access. The following will describe the above three stages in great details:

1) System Initialization

Given two large prime numbers p and q, it can obtain n=p*q. Letting g be the generator of the quadratic cyclic residue group modulo $n^2$, and letting $x \in_R [1, \varphi(n^2)]$, ($\varphi(n^2)$ be an Euler function), and it can be known that x and ord(G) are mutually prime. Calculating $y=g^x$, and it is known that y is the maximum order of the cyclic group G.

Safety parameter $\lambda$ is input obtain a bilinear pair e: $G_1 \times G_1 \rightarrow G_2$, where $G_1$ and $G_2$ are both multiplicative cyclic groups with a large prime number k as the order. Letting $g_1$ be the generator of $G_1$, and calculating $h=e(g_1, g_1)$. Three hash functions: $H_1:\{0,1\}^* \rightarrow Z^*_n$, $H_2:\{0,1\}^* \times G_1 \rightarrow Z^*_n$, $H_3:Z^*_n \rightarrow \{0,1\}$ are defined. From this, it can be obtained that the common parameter is: PP=(g, y, p, q, n, G, e, k, h, $G_1$, $G_2$, $H_1$, $H_2$, $H_3$).

When a user User joins the alliance chain system, the cloud server assigns a real identity $CID_U$ to him, stores the hash value of $CID_U$ mu=H1 $(CID_U)$ locally, and sends the user identity certificate $h_{1D}=H_1[pk_{BC}^{sk_{CS}}||H_1(pk_U^{sk_{CS}}||CID_U)]$ to the alliance chain. After that, the user will randomly select $x_i$ (belonging to $Z^*_p$) as the private key, from which the public key $pk_i=g^{x_i}$ can be calculated. Here, $(pk_{DO}, sk_{DO})$ is used to denote the public and private key pair of the data owner, while $(pk_{DU}, sk_{DU})$ is used to denote the public and private key pair of the data requester. Similarly, the public-private key pair of the cloud server CS is $(pk_{cs}, sk_{cs})=(g^{x_{cs}}, x_{cs})$, and the verification node of the alliance chain is $BV_i$, then the public-private key pair is $(pk_{BV_i}, sk_{BV_i})=(g^{x_{Bvi}}, x_{BV_i})$.

Figure 2:
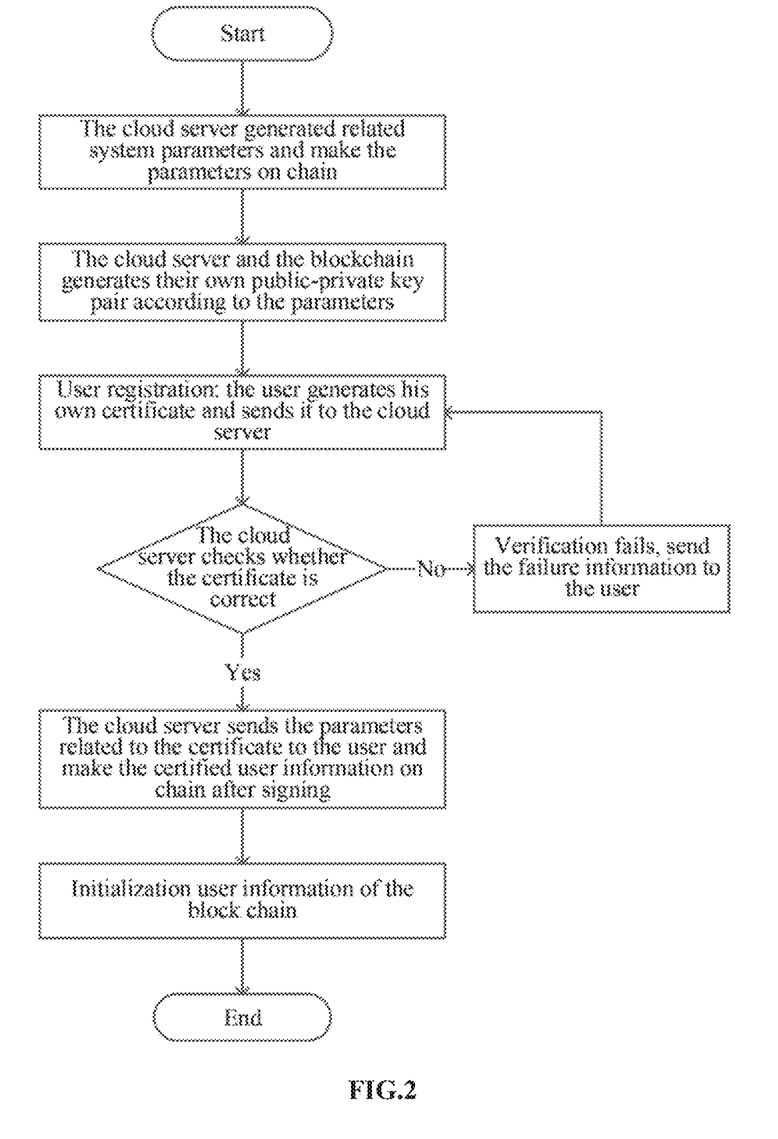
FIG. 2 is a flow chart of system configuration modules provided by the present disclosure.

Alliance chain consistency proof: defining a keyword set $W=(w_1, w_2, \ldots, w_n)$, and calculating $H_1(w_1)$, $H_1(w_2), \ldots, H_1(w_n)$. Constructing a polynomial $f(H_1(w_1))=0$, $i \in (1,2, \ldots, n)$ on the keyword set, and we can get $f(x)=(x-H_1(w_1))(x-H_1(w_2)) \ldots (x-H_1(w_n))=0$. Assume that there is a vector $\vec{d} =(1, d_{n-1}, \ldots, d_0)$, so the polynomial can be expressed as $f(x)=x^n+d_{n-1}x^{n-1}+ \ldots +d_1x+d_0=0$, then an equation can be obtained, $x^n+d_{n-1}x^{n-1}+ \ldots +d_1x=-d_0$, where $x=H_1(w_i)$. Let vector $$\vec{a} = (a_n, a_{n-1}, \ldots, a_1) = \left(-\frac{1}{d_0}, -\frac{d_{n-1}}{d_0}, \ldots, -\frac{d_1}{d_0}\right),$$

and vector $\vec{b} =[H_1(w_1), H_1(w_2)^2, \ldots, H_1(w_n)^n]$, we can get $\vec{a} \cdot \vec{b} =1$. If the keywords belong to the keyword set during the data encryption, the equation $\vec{a} \cdot \vec{b} =1$ holds. If more than ⅔ of the validators pass the verification, the alliance chain will generate a new block, as shown in FIG. 2.

2) Data Generation and Storage

When the data owner needs to upload his own data, he needs to encrypt his data to generate a transaction input data set. Here, four pieces of data need to be generated, which are the ciphertext of the sensitive data m, the ciphertext of the keyword w, the identity certification information, and proof of consistency respectively. Generation of these four pieces of data will be described in detail below.

First, the data owner needs to generate the ciphertext of the sensitive data m. The user encrypts the sensitive data m according to the joint public key PK of the cloud storage and the alliance chain management node $(PK=pk_{BV}^{sk_{CS}}=pk_{CS}^{sk_{BV}}=g^{sk_{CS} \cdot sk_{BV}})$ to obtain a first part of the transaction input data, $C_0=[m]_{pk}=\{(1+m*n)PK^r, g^r\}$.

Then, the user needs to extract the keyword w of the sensitive data m, it is noted that the keyword w needs to be in the keyword set defined by the system. The user first randomly selects two random numbers $r_1$, $r_2$ $(r_1, r_2 \in Z^*_n)$ to calculate $s_1=r_1 \cdot r_2^{-H_1(w)}$, $s_2=r_1^{-H_1(w)} \cdot r_2$, so the cipher text of the keyword w is $C_1=(s_1, s_2)$.

Then the user generates a pseudo-identity $ID_{DO}$: $ID_{DO}=CID_{DO} \oplus H_1(CID_{DO})^i$ according the real identity CID assigned by the cloud server, and generates identity verification information $$C_2 = (\alpha, \beta) = \left(g^{\frac{i+sk_{DO}}{H_1(CID_{DO})}}, H_3(g^i) \oplus CID_{DO}\right).$$

Finally, the user calculates $X=g^{rH_1(w)+r_0(sk_{DO}+H_1(w))}$, $Y=[Y_1, Y_2, \ldots, Y_n]=[g^{rH_1(w)}, g^{rH_1(w)^2}, \ldots, g^{rH_1(w)^n}]$, $Z=h^{r_0(sk_{DO}+H_1(w))}$, then the consistency proof $C_3=(X, Y, Z)$.

The data owner sends the generated data set $T_{xDO}=\{ID_{DO}, (C_0, C_1, C_2, C_3)\}$ to the cloud server.

After receiving the data set, the cloud server extracts $C_2$ in the data set to verify the identity of the data owner. The cloud server searches for the hash value μ of the real identity CID of the data owner, and calculates $CID^*_{DO}= H_1(\alpha^{\mu*pk^{-1}_{DO}}) \oplus \beta'$, to verify whether the equation $\mu=H_1 (CID^*_{DO})$ holds. If the equation holds, the uploaded data set is stored, and the data set is repackaged and signed and uploaded to the alliance chain.

The alliance chain receives the data set $T_{xDO}=\{ID_{DO}, I(C_0), C_1, C_3)\}$ sent by the cloud server (where $I(C_0)$ is the index value stored by $C_0$ in the cloud server), and verifies consistency of the data set: 1. verify whether the equation holds: $e(\Pi_{i=1}^n Y_i^{a_i}, Y_2)=e(Y_1, Y_1)$; 2. verify whether the equation holds: $e(X, g)=e(Y, g)Z$. If all verifications are passed, the data will be uploaded to the chain.

Figure 3:
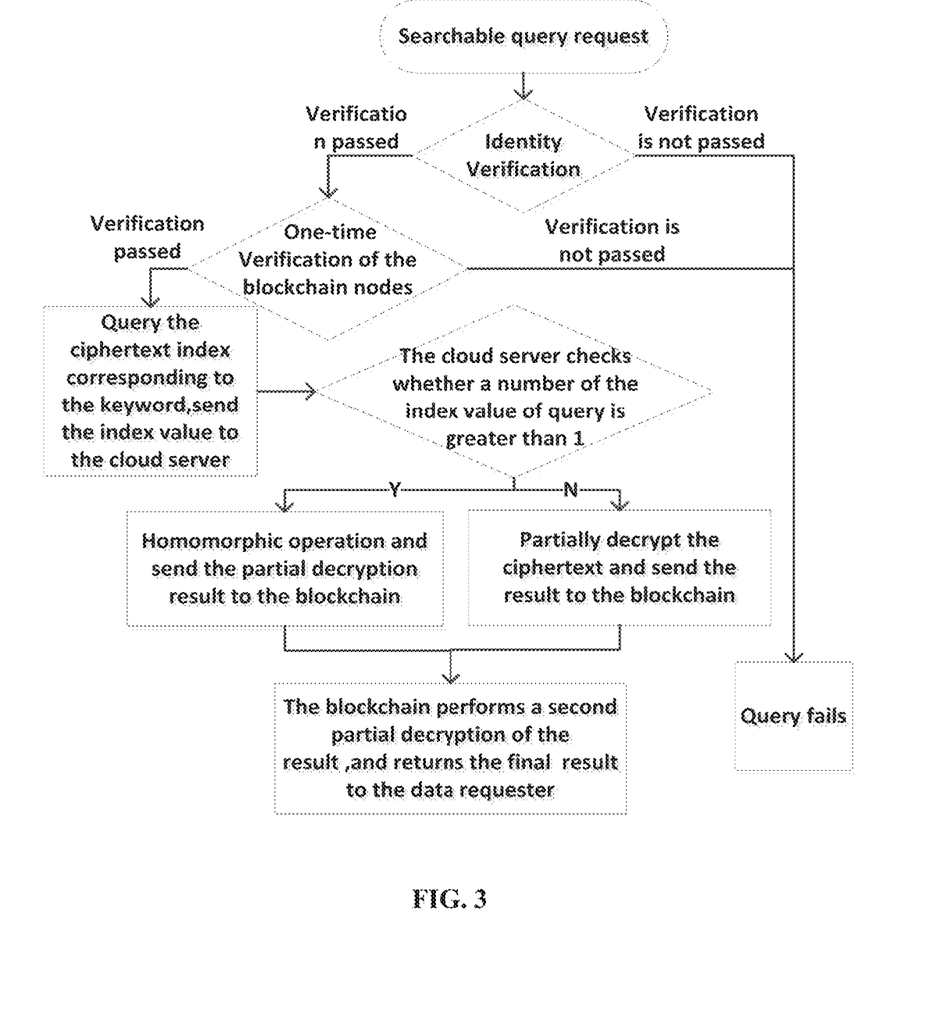
FIG. 3 is a flow chart of encrypting data in a user query system provided by the present disclosure.
Figure 4:
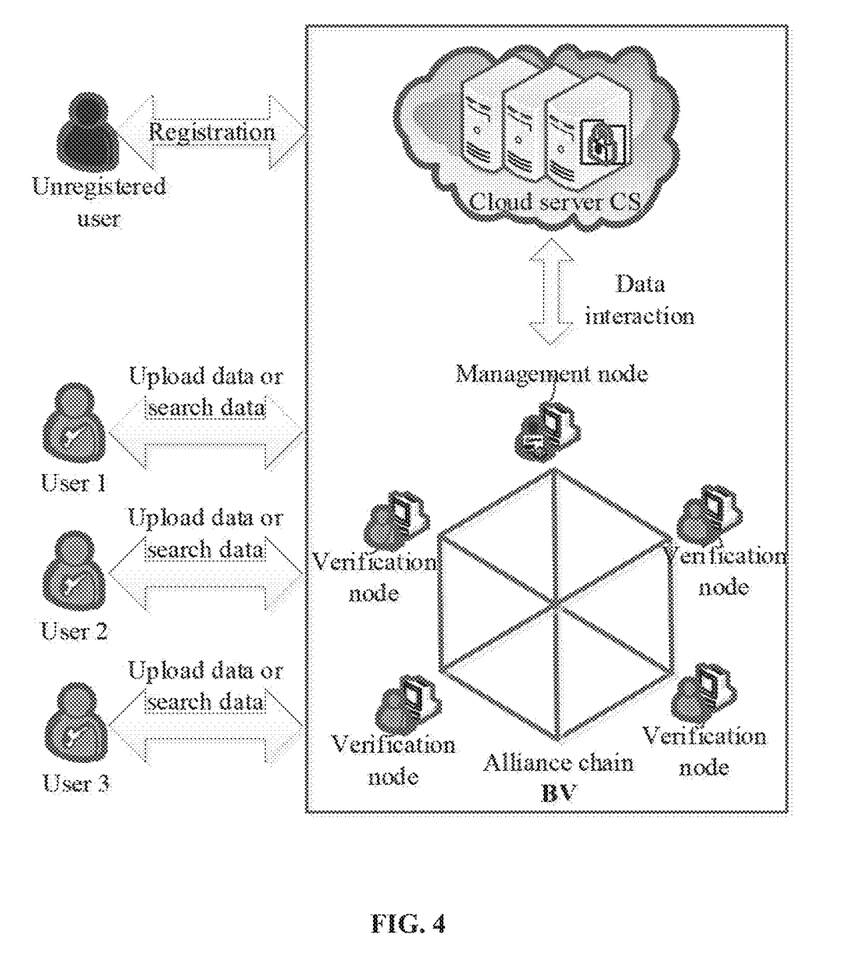
FIG. 4 is a system architecture schematic view of the searchable encrypted data sharing method based on blockchain and homomorphic encryption provided by the present disclosure.

3) Data Search and Access

If the data requester wants to access the data set with the keyword $w_i$, he needs to calculate the trapdoor function about the keyword $w_i$: $H_1(w_i)$, and encrypts the trapdoor function with the public key of the alliance chain manager: $C_0=[H_1(w_i)]_{pk_{BV}}=\{(1+H_1(w_i)*n)pk_{BV}^r, g^r\}$. After that, the data requester needs to calculate his own identity certificate: $h_{DU}=H_1(pk_{BV}^{sk_{DU}}||CID_{DU})$, and uses the public key of the alliance chain manager to encrypt the identity certificate: $C_1=[h_{DU}]_{pk_{BV}}=\{(1+h_{DU}*n)pk_{BV}^r, g^r\}$. Similarly, the data requester generates a pseudo ID according to the real identity $CID_{DU}$ issued by the cloud server: $ID_{DO}=CID_{DO} \oplus H_1(CID_{DO})^r$. Finally, the data requester sends a data request packet to the alliance chain manager: $Tx_{DU}=\{ID_{DU}, C_0, C_1\}$.

After the alliance chain manager receives the data packet from the data requester, it decrypts the data packet with its own private key to obtain $H_1(w_i)$, $h_{DU}$. The manager verifies the identity of the data requester, that is, to determine whether the equation holds, $h_{ID_{DU}}=H_1(pk_{CS}^{sk_{BV}} \| h_{DU})$; if the verification is passed, the ciphertext set that satisfies the keyword trapdoor is searched in the alliance chain, and the searched ciphertext index value and the user's public key signature which is signed to the cloud server.

After receiving the ciphertext index value set sent by the alliance chain, the cloud server searches the local database to find the ciphertext set corresponding to the index value set. If the number of index values is 1, use its own private key to partially decrypt the ciphertext and return the calculated result, $[m_i]_{pk_{BV}}=\{(1+m_i*n)PK^r, g^{r*sk_{CS}+h_1}\}$, to the alliance chain management node, where $h_1=H_1(pk_{DU}^{sk_{CS}} \| CID_{DU})$. If the number of index values is greater than 1, the cloud server performs homomorphic operations on the multiple ciphertext sets, and then uses its own private key to partially decrypt the homomorphic ciphertext data set. Finally, the cloud server sends the partially decrypted ciphertext set to the alliance chain management node.

After the alliance chain management node receives the partially decrypted ciphertext sent from the cloud server, it uses its own private key $sk_{BV}$ to perform a second partial decryption operation on the ciphertext set, to obtain a final ciphertext result set $[m_i]_{pk_{BV}}=\{(1+m_i*n)PK^r, g^{r*sk_{CS}sk_{BV}+h_1*sk_{BV}+h_2}\}$, where $h_2=H_1(pk_{DU}^{sk_{BV}} \| CID_{DU})$. The alliance chain management node sends the search results to the data requester.

After the data requester obtains the final ciphertext set, he uses his private key $sk_{DU}$ to calculate $h_2=H_1(pk_{DU}^{sk_{BV}} \| CID_{DU})$, $h_2=H_1(pk_{BV}^{sk_{DU}} \| CID_{DU})$, and then uses $h_1$ and $h_2$ to decrypt the search results to obtain the plaintext set $m_i$ corresponding to the keyword $w_i$, see FIG. 3 and FIG. 4.

The present disclosure provides a searchable encrypted data sharing system based on blockchain and homomorphic encryption, comprising:
- a first system initialization module, configured to generate related system parameters according to security parameters, the system parameters are used for generating user's public-private key pair, identity verification and consistency verification; and define a keyword set, which is for consistency verification of on-chain transaction;
- a second system initialization module, configured to, when a user joins an alliance chain, assign an identity identification to the user by a cloud server, and generate a public-private key pair and make a public key open by the user; sign the user's identity by the cloud server by using the user's public key, the public key of an alliance chain manager, and its own private key, and upload it to an alliance chain network;
- a first data transmission module, configured to encrypt his sensitive data and keywords corresponding to the sensitive data by the data owner, and send ciphertext of the sensitive data, ciphertext of the keyword, his own identity information and proof of consistency to the cloud server;
- a second data transmission module, configured to verify the identity of the data owner by the cloud server; if the verification succeeds, store the sensitive data in a local server, and sending a ciphertext index value of the sensitive data, the ciphertext of the keyword, and the proof of consistency to the alliance chain;
- a data storage module, configured to, after the alliance chain receives the data uploaded by the cloud server, verify the consistency of the message, and if the verification is passed, store the pseudo-identity information of the data owner, the ciphertext index value of the sensitive data and the ciphertext of the keywords in the alliance chain;
- a data request module, configured to generate a trapdoor function of the keyword by a data requester, and send the trapdoor function to the manager in the alliance chain;
- a ciphertext index value sending module, configured to, after receiving the request, verify the identity information of the data requester by the manager, and if the verification is passed, perform search operation, and send the ciphertext index value of the searched sensitive data to the cloud server:
- a first decryption result determination module, configured to receive the ciphertext index value of the sensitive data by the cloud server; if a number of index values is 1, perform a partial decryption operation on the ciphertext of the sensitive data, and send the partially decrypted ciphertext to the manager, then perform partial decryption on the data by the manager again, and return a final decryption result to the data requester;
- a second decryption result determination module, configured to, if the number of index values is greater than 1, perform a homomorphic operation on the ciphertext set, and then partially decrypt the ciphertext result after the homomorphic operation, and finally send the partial decryption result to the manager; the manager using his own private key to perform partial decryption after receiving the partially decrypted ciphertext set, and returning the final decryption result to the data requester;
- a data acquisition module, configured to, obtain the converted ciphertext data for the data requester, decrypt it with his own private key to obtain a plaintext message, so as to obtain the sensitive data related to the searched keywords.

The various embodiments in the specification are described in a progressive way. Each embodiment focuses on the differences from other embodiments, and for the same or similar parts of the various embodiments, refer to each other.

The principles and implementation of the present disclosure are described by using specific examples. The explanations of the above embodiments are only used to help to understand the method and core ideas of the present disclosure. Meanwhile, there will be changes in the specific implementation and the scope of application for those of ordinary skill in the art, which fall within the spirit of the present invention. To sum up, the content of the specification should not be construed as limitation of the present invention.

What is claimed is:

1. A searchable encrypted data sharing method based on blockchain and homomorphic encryption, comprising the following steps:
   a) performing system initialization by:
      generating relevant system parameters according to security parameters, the system parameters being used to generate a public-private key pair of a user, identity verification and consistency verification; and defining a keyword set, which is used for the consistency verification of on-chain transaction; and when the user joins an alliance chain, a cloud server assigning an identity identification to the user, and the user generating the public-private key pair and makes his/her public key open, the cloud server signing the user's identity by using the user's public key, a public key of an alliance chain manager, and its own private key, and uploading it to an alliance chain network;

b) performing data release by:

a data owner encrypting his sensitive data and keywords corresponding to the sensitive data, and sending ciphertext of the sensitive data, ciphertext of the keyword, his/her own identity information and proof of consistency to the cloud server;

the cloud server verifying the identity of the data owner; if the verification succeeds, the sensitive data being stored in a local server, and a ciphertext index value of the sensitive data, the ciphertext of the keyword, and the proof of consistency being sent to the alliance chain; and after the alliance chain receives the data uploaded by the cloud server, it verifying the consistency of the message; if the verification is passed, the pseudo-identity information of the data owner, the ciphertext index value of the sensitive data and the ciphertext of the keywords being stored in the alliance chain;

c) performing a data request by:

a data requester generating a trapdoor function of the keyword, and sending the trapdoor function to the manager in the alliance chain;

after receiving the request, the manager verifying the identity information of the data requester; if the verification is passed, performing search operation, and sending the ciphertext index value of the found sensitive data to the cloud server;

the cloud server receiving the ciphertext index value of the sensitive data; if the number of index values is 1, a partial decryption operation being performed on the ciphertext of the sensitive data, and the partially decrypted ciphertext being sent to the manager; the manager then performing partial decryption on the data again, and returning a final decryption result to the data requester; and if the number of index values is greater than 1, performing a homomorphic operation on the ciphertext set, and then partially decrypting the ciphertext result after the homomorphic operation, and finally sending the partial decryption result to the manager; the manager using his own private key to perform partial decryption after receiving the partially decrypted ciphertext set, and returning the final decryption result to the data requester; and d) performing data acquisition by:

the data requester obtaining the converted ciphertext data, decrypting it with his own private key to obtain a plaintext message, so as to obtain the sensitive data related to the searched keywords.

2. The searchable encrypted data sharing method based on blockchain and homomorphic encryption according to claim 1, wherein the cloud server is configured to store the ciphertext of the sensitive data.

3. The searchable encrypted data sharing method based on blockchain and homomorphic encryption according to claim 1, wherein the user randomly generates a public-private key pair according to the system public parameters, and the generation of the public-private key pair is independent from a trusted third party.

4. The searchable encrypted data sharing method based on blockchain and homomorphic encryption according to claim 1, wherein the cloud server assigns real identity information to the user, and the user uses pseudo-identity information to upload data and request data operations.

5. The searchable encrypted data sharing method based on blockchain and homomorphic encryption according to claim 1, wherein from top to bottom, the alliance chain comprises: an application layer, a contract layer, an incentive layer, a consensus layer, a network layer and a data layer; the data layer is used to store transaction logs and transaction-related contents, that is, the pseudo-identity information of the data owner, ciphertext index and keyword ciphertext; the consensus layer adopts a practical Byzantine fault-tolerance (PBFT) consensus algorithm.

6. A searchable encrypted data sharing system based on blockchain and homomorphic encryption, comprising:

a first system initialization module, configured to generate related system parameters according to security parameters, the system parameters are used for generating user's public-private key pair, identity verification and consistency verification; and define a keyword set, which is for consistency verification of on-chain transaction;

a second system initialization module, configured to, when a user joins an alliance chain, assign an identity identification to the user by a cloud server, and generate a public-private key pair and make a public key open by the user; sign the user's identity by the cloud server by using the user's public key, the public key of an alliance chain manager, and its own private key, and upload it to an alliance chain network;

a first data transmission module, configured to encrypt his sensitive data and keywords corresponding to the sensitive data by the data owner, and send ciphertext of the sensitive data, ciphertext of the keyword, his own identity information and proof of consistency to the cloud server;

a second data transmission module, configured to verify the identity of the data owner by the cloud server; if the verification succeeds, store the sensitive data in a local server, and sending a ciphertext index value of the sensitive data, the ciphertext of the keyword, and the proof of consistency to the alliance chain;

a data storage module, configured to, after the alliance chain receives the data uploaded by the cloud server, verify the consistency of the message, and if the verification is passed, store the pseudo-identity information of the data owner, the ciphertext index value of the sensitive data and the ciphertext of the keywords in the alliance chain;

a data request module, configured to generate a trapdoor function of the keyword by a data requester, and send the trapdoor function to the manager in the alliance chain;

a ciphertext index value sending module, configured to, after receiving the request, verify the identity information of the data requester by the manager, and if the verification is passed, perform search operation, and send the ciphertext index value of the searched sensitive data to the cloud server;

a first decryption result determination module, configured to receive the ciphertext index value of the sensitive data by the cloud server; if a number of index values is 1, perform a partial decryption operation on the ciphertext of the sensitive data, and send the partially decrypted ciphertext to the manager, then perform partial decryption on the data by the manager again, and return a final decryption result to the data requester;
a second decryption result determination module, configured to, if the number of index values is greater than 1, perform a homomorphic operation on the ciphertext set, and then partially decrypt the ciphertext result after the homomorphic operation, and finally send the partial decryption result to the manager; the manager using his own private key to perform partial decryption after receiving the partially decrypted ciphertext set, and returning the final decryption result to the data requester;
a data acquisition module, configured to, obtain the converted ciphertext data for the data requester, decrypt it with his own private key to obtain a plaintext message, so as to obtain the sensitive data related to the searched keywords.

* * * * *

UNITED STATES PATENT AND TRADEMARK OFFICE
CERTIFICATE OF CORRECTION

| | |
|---|---|
| PATENT NO. | : 11,973,889 B2 |
| APPLICATION NO. | : 17/610882 |
| DATED | : April 30, 2024 |
| INVENTOR(S) | : Song Han et al. |

It is certified that error appears in the above-identified patent and that said Letters Patent is hereby corrected as shown below:

On the Title Page

Item (73) Assignees:
Please delete the third applicant, "Insititute Of Information Engineering, CAS" and replace with
-- Institute Of Information Engineering, CAS --

Signed and Sealed this
Fourth Day of June, 2024

Katherine Kelly Vidal
*Director of the United States Patent and Trademark Office*